(12) United States Patent
Bozaglo et al.

(10) Patent No.: US 10,616,677 B2
(45) Date of Patent: Apr. 7, 2020

(54) UTILITY LIGHTWEIGHT HEADPHONES

(71) Applicants: Meir Bozaglo, Brooklyn, NY (US); Habib Halabi, Brooklyn, NY (US)

(72) Inventors: Meir Bozaglo, Brooklyn, NY (US); Habib Halabi, Brooklyn, NY (US)

( * ) Notice: Subject to any disclaimer, the term of this patent is extended or adjusted under 35 U.S.C. 154(b) by 0 days.

(21) Appl. No.: 16/219,972

(22) Filed: Dec. 14, 2018

(65) Prior Publication Data

US 2019/0230429 A1 Jul. 25, 2019

Related U.S. Application Data

(60) Provisional application No. 62/619,734, filed on Jan. 20, 2018.

(51) Int. Cl.
| | |
|---|---|
| *H04R 1/10* | (2006.01) |
| *H04R 1/08* | (2006.01) |
| *H04R 5/033* | (2006.01) |
| *H04W 4/80* | (2018.01) |

(52) U.S. Cl.
CPC ............ *H04R 1/1041* (2013.01); *H04R 1/08* (2013.01); *H04R 1/1008* (2013.01); *H04R 1/1025* (2013.01); *H04R 5/0335* (2013.01); *H04W 4/80* (2018.02); *H04R 2420/05* (2013.01); *H04R 2420/09* (2013.01); *H04R 2460/01* (2013.01)

(58) Field of Classification Search
CPC ...... H04R 1/1041; H04R 1/1008; H04R 1/08; H04R 5/0335; H04R 1/1025; H04R 2420/05; H04R 2460/01; H04R 2420/09; H04R 5/033; H04R 2201/103; H04R 1/1091; H04R 1/1083; H04W 4/80
See application file for complete search history.

(56) References Cited

U.S. PATENT DOCUMENTS

| | | | |
|---|---|---|---|
| 8,737,668 B1* | 5/2014 | Blair .................... | H04R 1/1066 381/378 |
| 9,271,063 B2 | 2/2016 | Saideh | |
| 10,154,333 B2 | 12/2018 | Campbell | |
| 2010/0189303 A1* | 7/2010 | Danielson ............ | H04R 1/1008 381/378 |
| 2011/0002478 A1* | 1/2011 | Pollard ................ | H04R 1/1041 381/74 |
| 2012/0269356 A1* | 10/2012 | Sheerin ................ | H04R 29/004 381/58 |
| 2014/0205130 A1* | 7/2014 | Blair .................... | H04R 5/0335 381/378 |
| 2016/0295313 A1* | 10/2016 | Martin ................. | H04R 1/1041 |
| 2016/0316181 A1 | 10/2016 | Hamra | |
| 2018/0054667 A1 | 2/2018 | Yamkovoy | |

* cited by examiner

*Primary Examiner* — Tuan D Nguyen

(74) *Attorney, Agent, or Firm* — Joshua Kaplan, Esq.; Kaplan Law Practice, LLC

(57) ABSTRACT

Disclosed is a multifunction personal audio emulation device having a cushioned headband with noise cancelling ear cups. The cushioned headband is approximately half an inch thick and with cups being one inch thick. Fitted into the headband further is an independent rechargeable battery source a USB connection for data and electric power input and at least one other universal serial bus output. The personal audio device may connect to an external audio output device using a wired or a wireless connection. The personal audio device is further capable of data storage, including storage for replay of content via the sound drivers of the device.

18 Claims, 8 Drawing Sheets

UTILITY LIGHTWEIGHT HEADPHONES

CLAIM OF PRIORITY

This application claims priority to U.S. Provisional Patent Application No. 62/619,734 filed on Jan. 20, 2018, the contents of which are fully incorporated herein by reference.

FIELD OF THE INVENTION

The present invention relates to an audio device, in particular to light weight noise cancellation headphones for wireless audio presentation.

BACKGROUND OF THE INVENTION

The idea of a personal audio device has been around since an audio device was first invented, then in connection with gramophones and telephones. Since its initial introduction in the last century, personal acoustical devices have been getting smaller, with steadily improving audio clarity and increasingly appealing aesthetics.

Audio headphones provide a solution for several problems. First, there is the portability of sound. The quality of acoustic replication is the likely sacrifice of device miniaturization. Second, sound amplification should adequately calibrate sound to a desired setting without disturbing occupants within the vicinity of the user. Third, the environment of the user should not preclude and interfere with user's enjoyment of listening experience. Finally, the hardware components should be comfortable and not distress the soft tissue in and around the human ear.

Today many solutions proliferate that resolve all four problems inherent with portable audio devices. However, there are two additional problem areas that have been largely overlooked in the quest to resolve the aforementioned problems. First, a device solving all four problems identified in the previous paragraph has always been bulky and heavy. Second, portable devices that serve as audio/video players, need frequent recharging.

The device being embodied in the present invention aims to solve all the aforementioned problems without the downside of weight and girth. Additionally, the disclosed device is able to function as a battery pack. In addition to all these aforementioned features, the disclosed device not only delivers a great quality of sound, it also excludes external noises through outstanding insulation or, in addition to this, through active noise cancellation. In addition to all aforementioned features, the disclosed device is capable of receiving audio signals for retransmission to an external device, such as a mobile telephone or a personal computer.

SUMMARY OF THE INVENTION

The device embodied in the present invention includes two headphone cups. Each headphone cup is equipped with perimeter padding for greater comfort and listening isolation. The back or outside cap of either headphone cup may contain control keypad for controlling volume and content playing on the headphones. The control impulses are sent to an audio device, such as a personal music player or mobile phone, which then interprets said impulses to produce the desired level of audio and content adjustment. The audio controls may be duplicated in more than one location along the cups.

At least one of the headphone cups may contain a microphone receiver. Data content from said receiver is sent to a mobile phone or to a device capable of responding to verbal input using a removable wired connection or using a shortwave radio connection.

Headphones disclosed in this invention preferably contains an independent rechargeable power source on board or may rely on a flow of electrical power from an audio/video device through a wired connection. The headphones may then be utilized as a power bank for other devices, or as a portable storage device. The headphone cups are linked by a padded headband which maximizes comfort and provides a channel for wired connectivity between cups.

Headphones utilize light weight materials to reduce the size and weight of the headphones.

DESCRIPTION OF THE PREFERRED EMBODIMENTS

Figure 1:
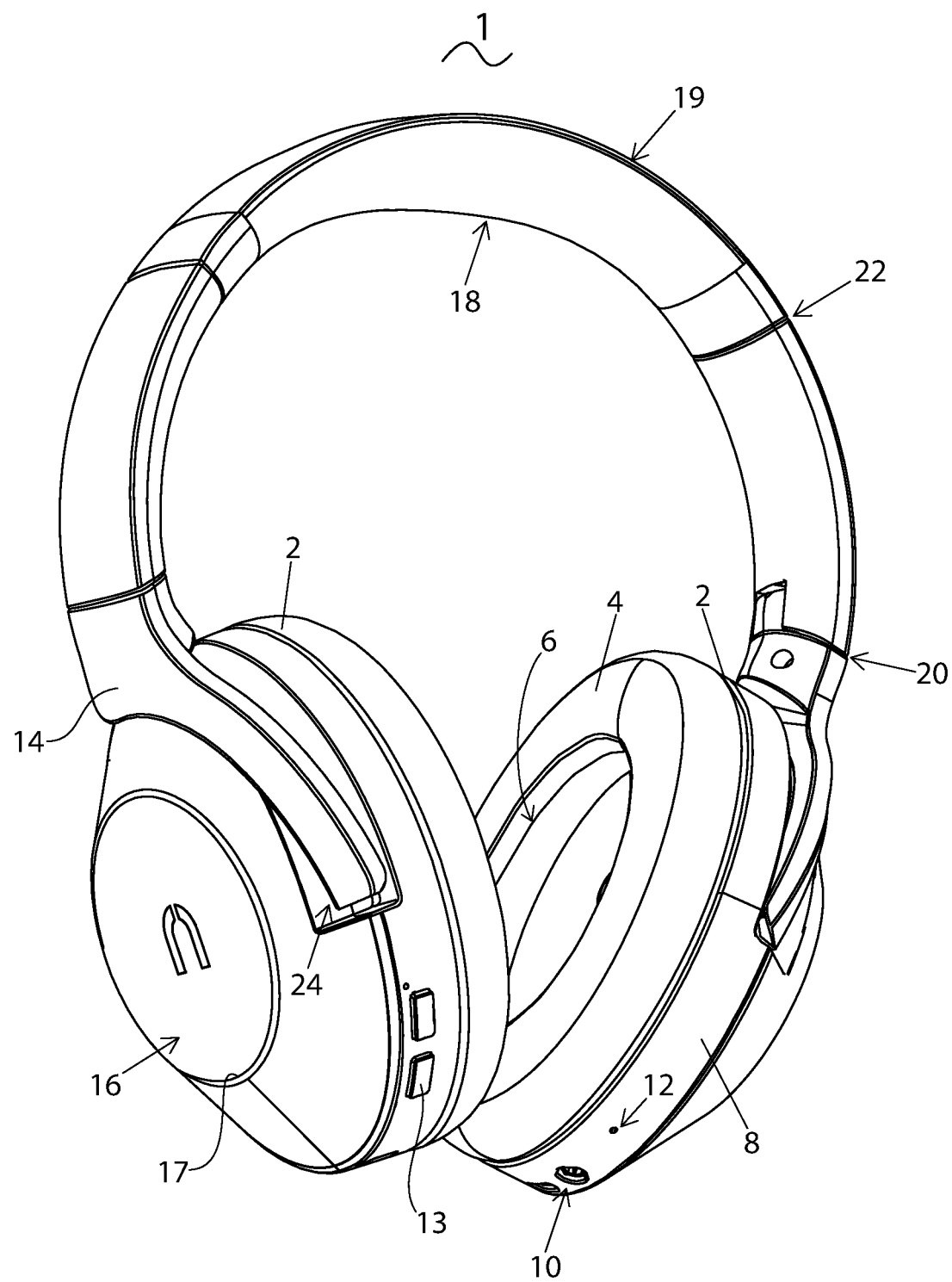
FIG. 1 is the perspective view of the present invention, demonstrating audio controls.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Turning now descriptively to the drawings, in which similar reference characters denote similar elements throughout the several views, the figures illustrate a device embodied in the present invention. Shown in FIG. 1 is the device 1 having two headphone cups 2, each with insulating perimeter padding 4. Shown also are universal serial ports 13 intended for connector type B, and a back panel 17 doubling as an on/off power button 16. A built-in microphone 12 is strategically placed near what would be a user's mouth, along a sidewall 8 of at least one of the two headphone cups 2. The cups 2 are connected to the C arm 14 through a pivot 24, which is preferably hollow to serve as a conduit for wiring that connects the two cups 2 (not shown). Such a conduit would pass through the cushioned section 18 of the headband 19.

The logo indicator 21 is lit in stages to indicate charge level of the internal battery, with full charge of the battery causing the logo indicator 21 to be lit along the entire length of the indicator 21, with a gradual fading of the charge causing a corresponding portion of the length of the logo indicator 21 to darken or be turned off. This effect may be enabled by placing multiple LEDs along the length of the indicator 21 or using a combination of glass rods placed between light emitting diodes. The logo indicator 21 may also be used to display whether the headphone 1 is connecting to a remote device using short wave radio, whether the headphones 1 is connecting wirelessly to a local network, or whether the headphones 1 is being used to recharge a device. In each of these scenarios, the logo indicator 21 will glow with the specific color that represents the specific operation. Since multiple LEDs are used, various shades of lighting may be enabled simultaneously, without interfering with the fading feature of the indicator 21 that demonstrates electrical charge of the onboard power source. Alternatively, separate indicators 21 may be used to confirm operation of a feature and to demonstrate level of battery charge.

Figure 2:
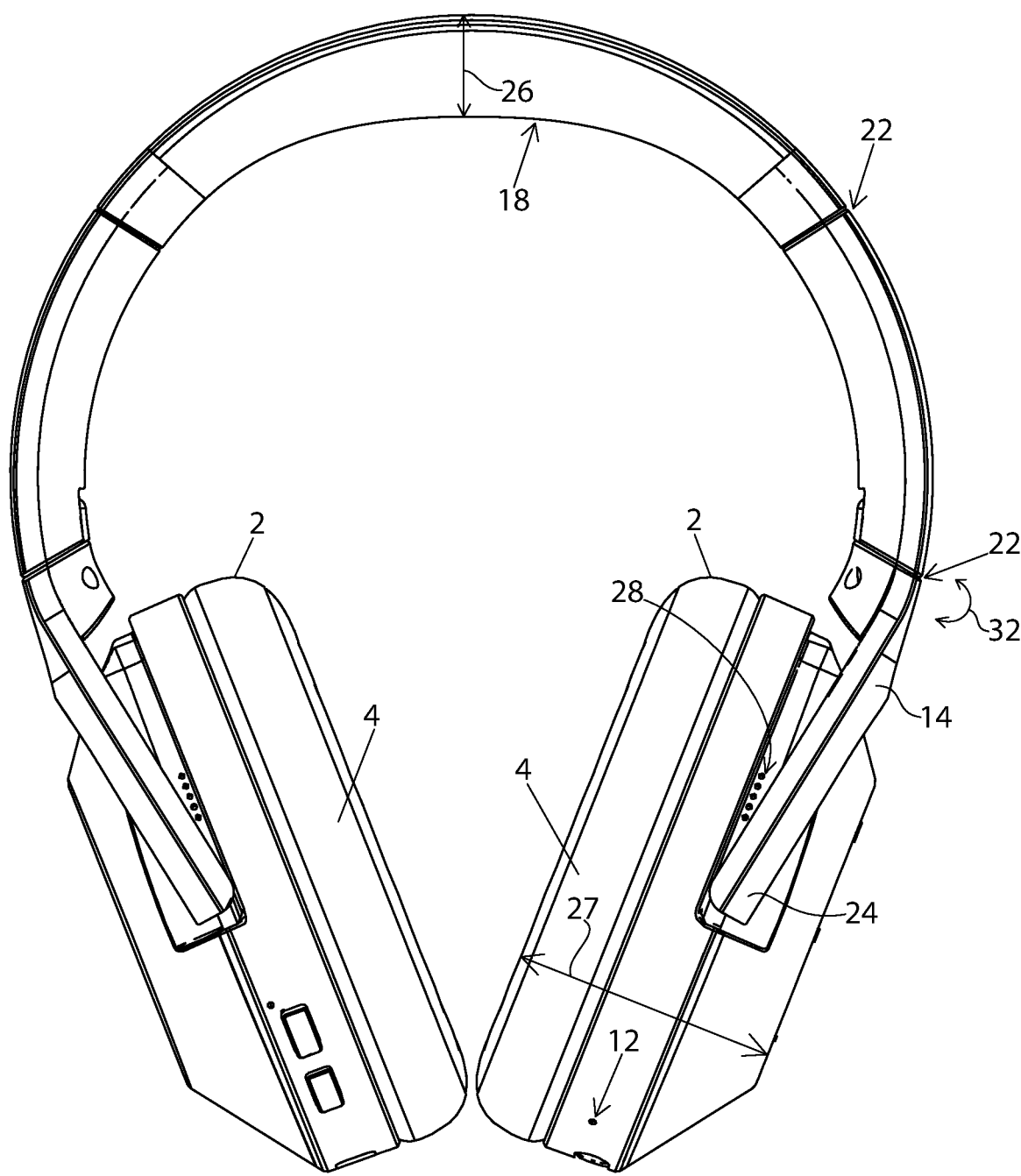
FIG. 2 is the front view of the present invention showing various controls.
Figure 7:
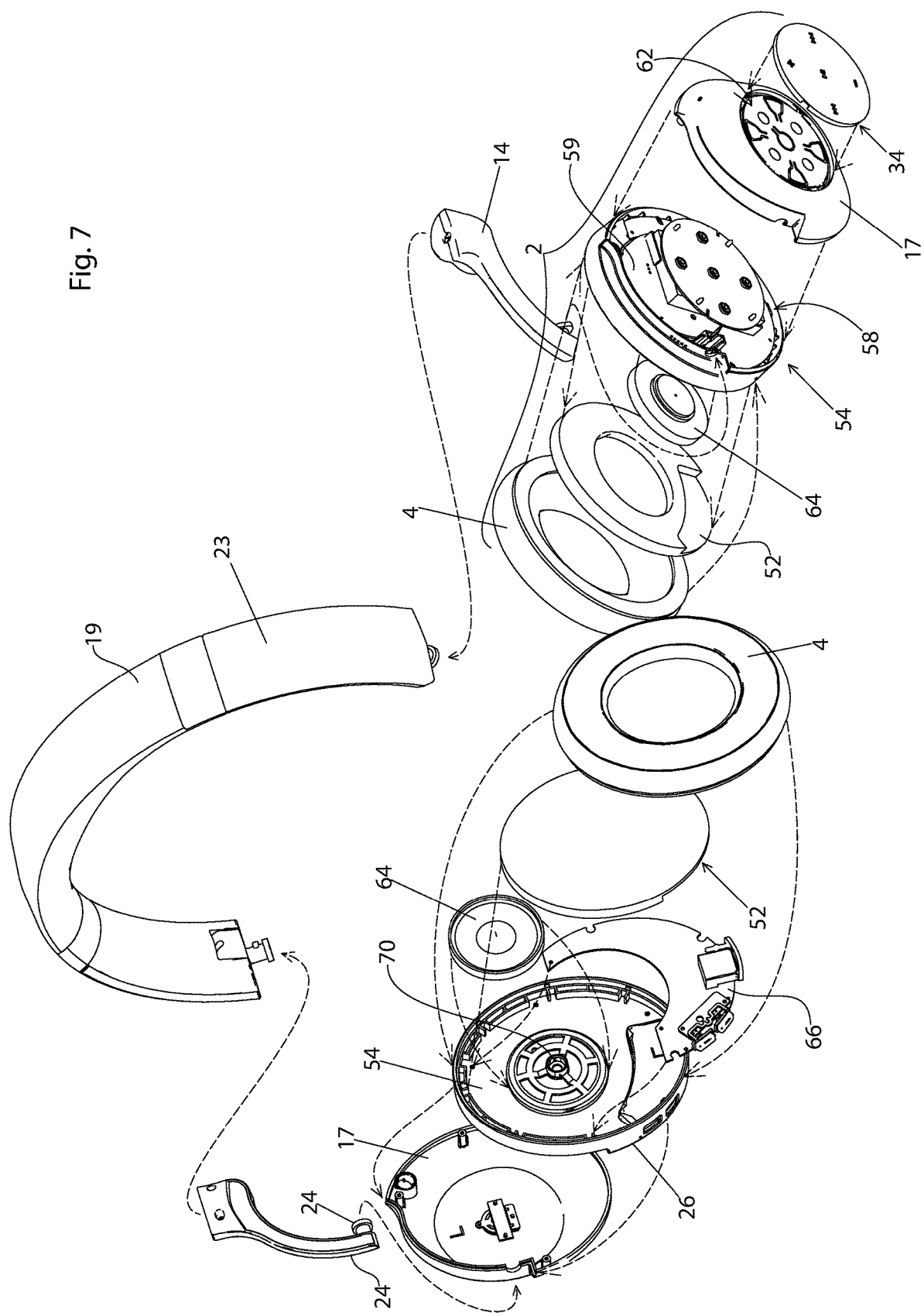
FIG. 7 is an exploded diagram of the present invention.

FIG. 2 demonstrates the front view of the device disclosed in the present invention. Shown are cups 2 that pivot about an attachment point 24. The pivot 24 adjusts the pitch of the cups 2 to achieve a flush connection with an outer ear of a user. The openings 28 behind the C connector 14 enhance the air flow to the internal diaphragm of the headphones (item 64 of FIG. 7). The padding 4 incorporates weight reducing features such as, but not limited to, having a hollow channel running the length of the cushioned section 18 that deflates under pressure and which re-inflates when not being pressed against an ear. The deflation and reinflation is enabled by a more rigid sidewall 5 of the padding 4. Other features may include ultrathin padding 4, which does not sacrifice the cushion factor by accommodating soft filings such as gel or foam. The thickness 26 of the cushioned headband 18 is just one half of an inch, which is achieved by using flexible armature within the cushioning filler 4 that permits controlled contouring about a wearer's head rather than general sinking of padding as present in the present art. Less cushioning generally means lighter weight, cheaper production and retail costs and reduced bulk for a more elegant fit on one's head. The preferred thickness 27 of a cup 2 is approximately ¾ of an inch and is achieved by using thin but soft and adhering cushioning materials as well as superior layout of components internal to the cup 2 (FIG. 7). The overall weight of the headphones 1 is between 8 and 10 ounces.

Figure 3:
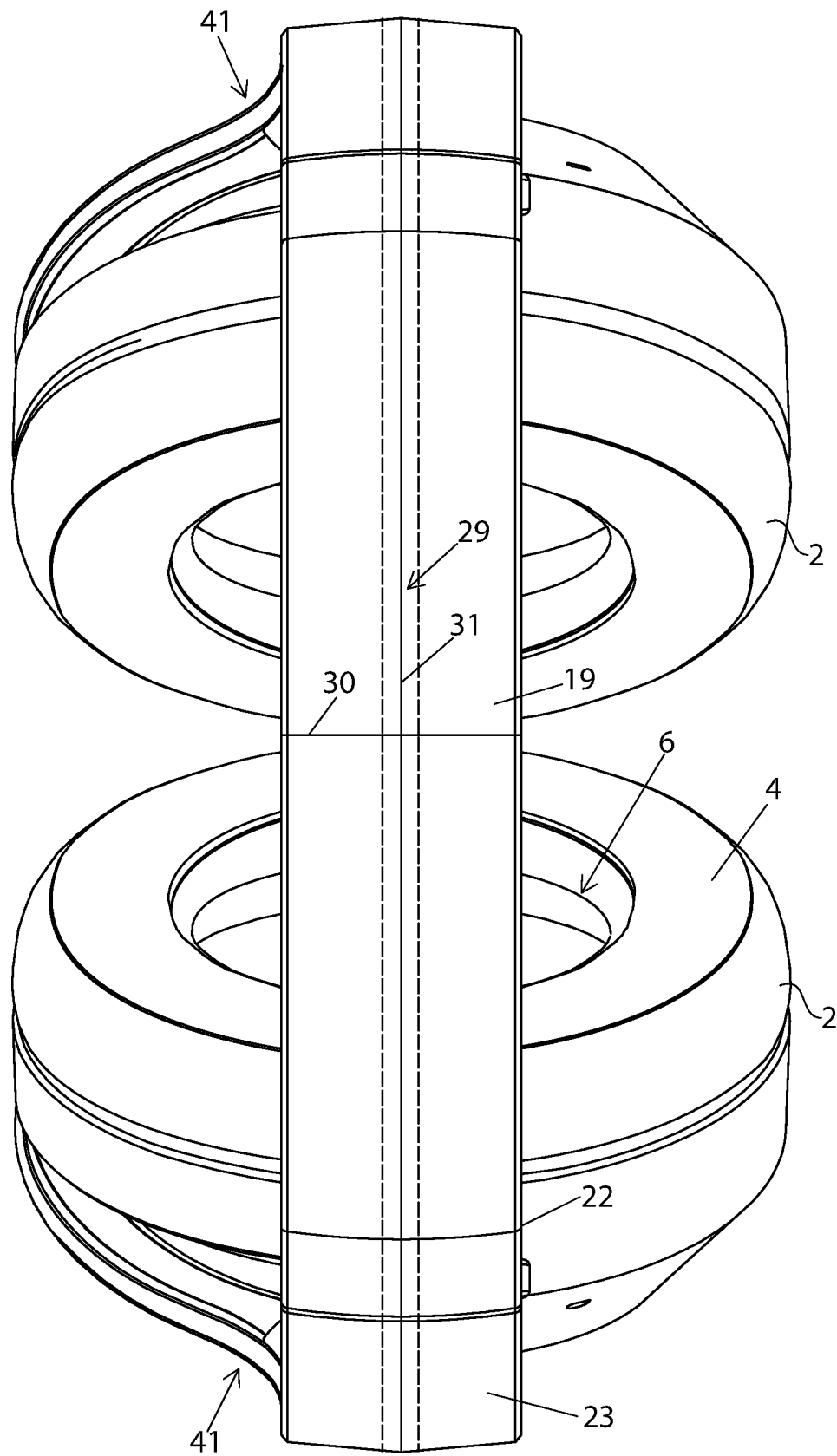
FIG. 3 is the top view of the present invention.

FIG. 3 shows the top of the device embodied in the present invention. Shown are two cups 2 with cushions 4 that surround a sound cavity 6 and headband 19. The headband 19 is able to fold at the crest 30. To accommodate larger heads, the headband's 19 side arms 23 extent one to three inches away from the crest 30. The end portion 20 of the headband is capable of oscillating in direction 32 to help with portability of the device or to ensure a better fit. Materials for the exterior portions of the device 1, such as the rear cover 17 and the headband 19, may be made from aluminum or light metal alloys, carbon fiber, plastic or wood. The cushioned portions such as the perimeter cushions 4 and the internal sound cavity 6, may be made from artificial fabrics filed with gel or foam, leather or reinforced polymers. The perimeter cushions 4 are used to absorb noise coming from the outside and sounds emitted by the headphone cup 2, thus channeling a sound toward listeners ears instead of dispersing the sound into the environment, which undermines the acoustics and creates noise pollution for those around the listener. The conduit 29 runs the length of the headband 19 and continues through the side arms 23 two each of the distal ends 41 and into the headphone cups 2. The conduit 29 carries electronic wiring 31 between components of each of the headphone cups 2. Alternatively, communication between components of the headphone cups 2 may be accomplished through short range radio wave signals traveling between sender/receivers in each of the headphone cups 2.

Figure 4:
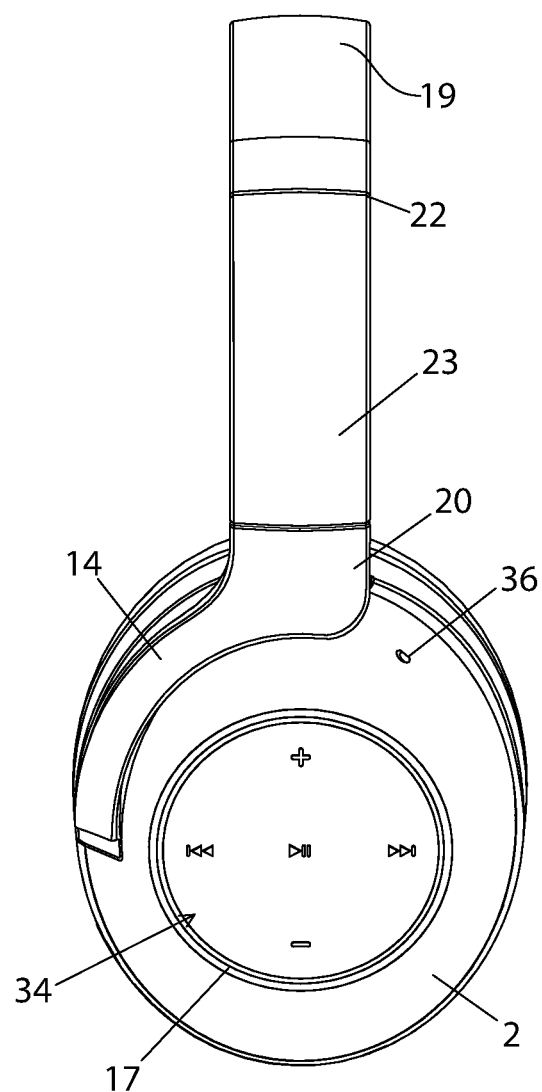
FIG. 4 is the side view of the present invention showing the control pad.

FIG. 4 demonstrates as sideview of the present invention, shown is the headband 19, a telescoping side arm 23, a pivoting end portion 20 coupling with the C connector 14. The headphones cup shown features a control pad 34 on its back panel 17. The controls include volume adjustment, music track selection as well as play and pause selections. Also shown is component 36, which may be a shortwave radio sender/receiver or a utility light. Alternatively, a utility light and/or a shortwave radio sender/receiver may be both present on separate location on the device.

Figure 5:
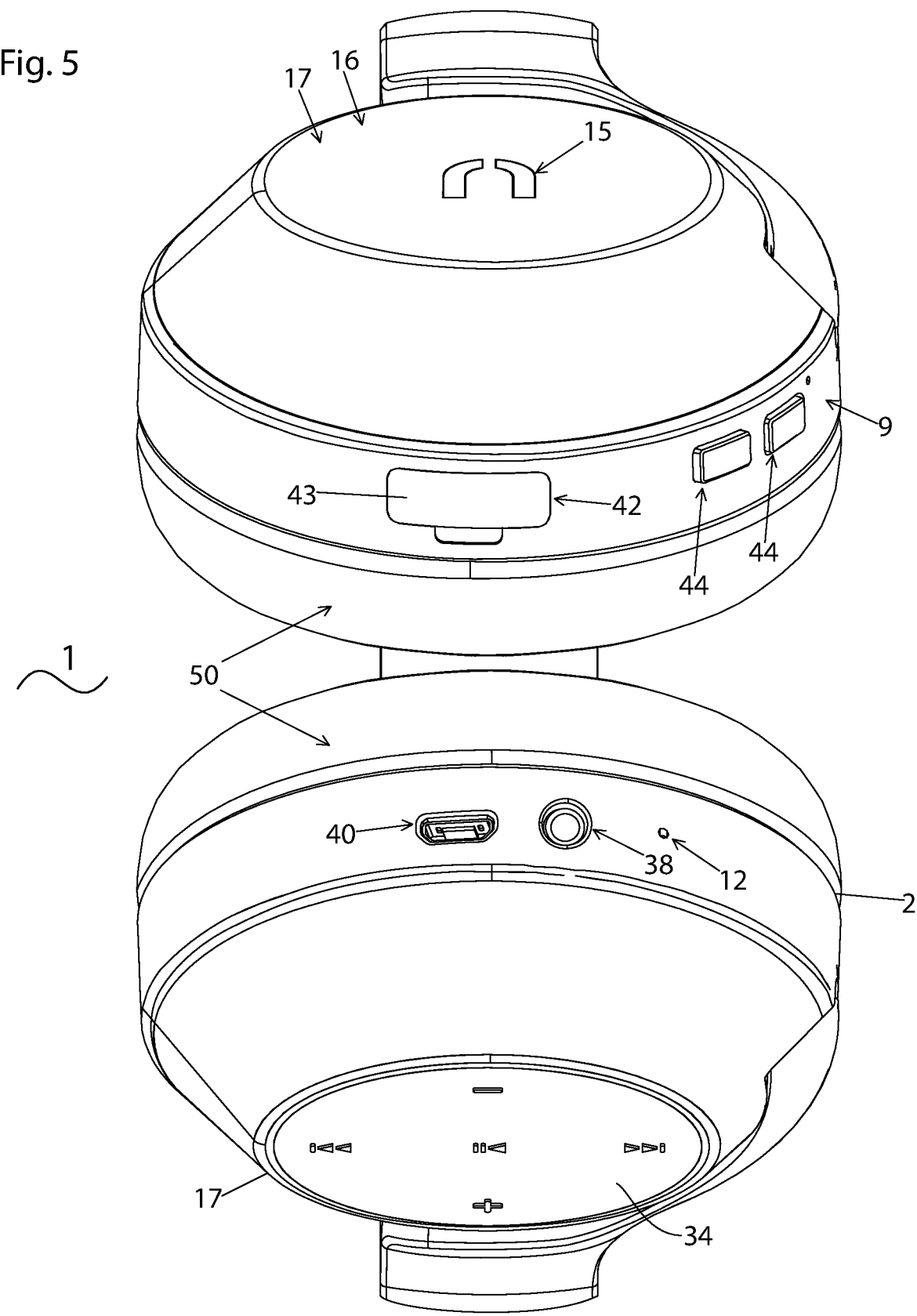
FIG. 5 is the bottom view.

FIG. 5 is a closer view of the various input, output and control ports available with the present invention. The back cover 17 on the right cup 9 contains a power on/off button for the device. The surface 17 may also contain an information screen 15, and a display of the battery charge level using the display indicator 21. The information screen 15 may be used to display the description of the content being played by the headphones 1, while the display indicator 21, shaped like a manufacturer's logo displays the level of battery charge or functionality being used, by the headphones 1. The screen 15 may also serve as a utility light. On the opposing cup 2, the back cover 17 features audio controls 34, which may feature volume controls, track controls and stall/pause buttons. Alternatively, the audio controls 34 may incorporate the on/of button 16 and/or be placed on any surface throughout the headphones device 1.

Further down at the base 50 of each cup 2 are additional connection ports, for connection to audio devices and peripheral systems. Shown is the audio connection port 38 a universal serial bus A connector port 40 and a universal serial bus B connector 42 hidden with a cover 43. It should be noted that while the A and B universal connector parts have been placed on opposite ear cups, they may be on the same cup 2. Also shown are command controls 44 buttons for controlling microphone volume, active noise cancellation, a toggle between services, or a just a remote-control service controlling a remote device (not shown).

Figure 6:
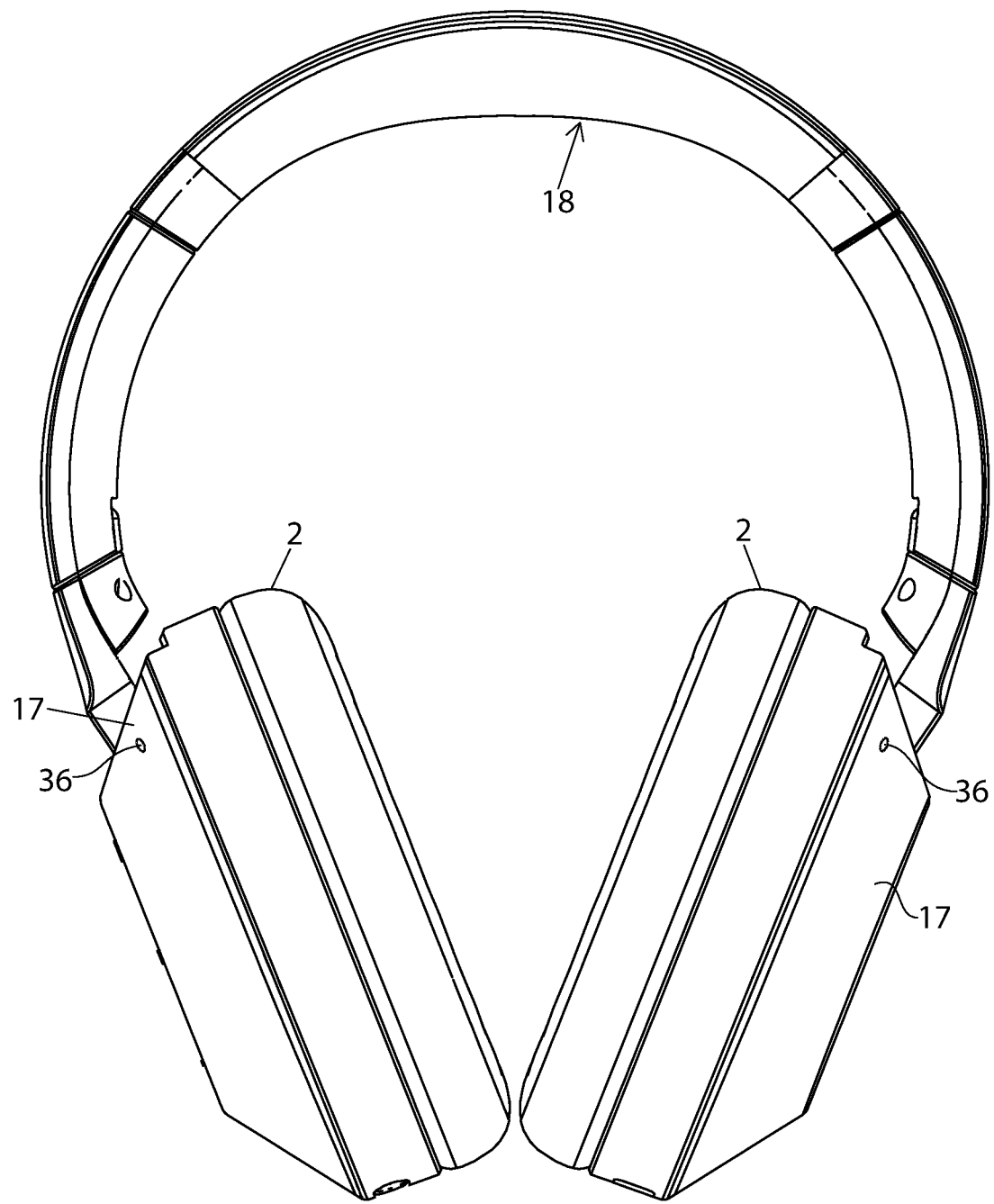
FIG. 6 is the back view or view of the side opposite the one shown in FIG. 2.

Additional functionality is visible in FIG. 6, which demonstrates component 36 on back cover 17. The component 36 may function as a shortwave radio signal sender and receiver device, safety illumination device, or a heat ventilation solution. The component 36 may fulfill multiple such purposes. For example, a strobe light used as a component 36, may be placed there in conjunction with a shortwave radio receiver. The safety component is highly useful as users of the device embodied in the disclosure at hand may get distracted by the content being transmitted through the headphones and may fail to notice or hear approaching hazards and dangers. The strobe lights represented by the component 36 may alert actors of the surrounding environment of user's presence.

FIG. 7 demonstrates an exploded diagram demonstrating internal components. Shown are cups 2 having a cushion 4, an inner cover 52, a sound driver 64, an internal panel 54, having audio emitting device 59, onboard power storage 58, outer cover 17, which contains a control bed 62 on at least one of the two ear cups and a switch or control pad 34. Opposing cup 2 is then comprised of a cushion ring 4, an inner cover 52, a sound driver 64, a circuit board 66, an internal panel 54 and an outer cover 17; with this headphones cup 2 also having a control bed 62 and a power switch (not visible). The circuit board 66 provides a communication bus for a microphone, a shortwave communication chip(s) (all embedded within the internal panel 54), an active noise cancelling microphone 70 and device charging or data storage capabilities. As stated in another part of the present disclosure, an onboard power storage 58 may be coupled with a flash memory, turning the audio amplification device disclosed in the present invention into a data storage device.

Figure 8:
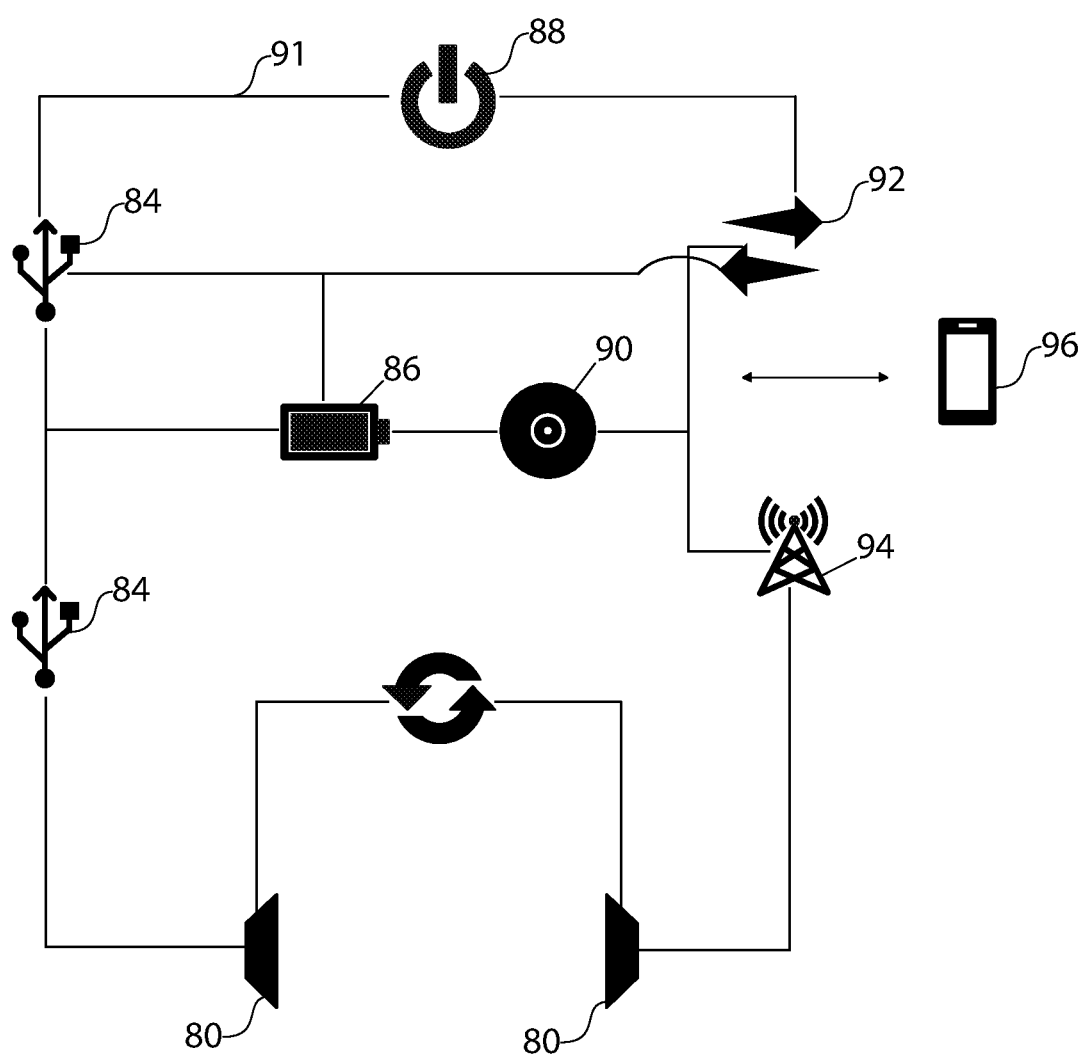
FIG. 8 is a schematic of the onboard circuitry.

The seemingly familiar headphones device disclosed, carries a trove of useful technological features seamlessly integrated together into a novel combination of entertainment and functionality. Shown in FIG. 8 is a diagram of components linked by common circuitry 91. While the circuit 91 is shown as one uninterrupted connection, one skilled in the art would understand that functionality of each component would be enabled or bypassed using electrical gates and switches. Additionally, each component shown in FIG. 9 may be enabled using a sub-circuit common to a device of this kind. The circuitry is turned on and off using a switch 88. Energy to power all listed components is provided by a rechargeable power source 86, which is preferably a lithium ion battery, used to energize an onboard storage chip, which may be powered by an external source through one of the onboard universal bus ports 84. One of the universal serial bus connections 84 is used as an input port, while the other USB port 84 is an output port. The battery may be recharged using an input/output port 92, which may be an audio/data port, or a combination of audio/data and power, similar to a universal serial bus connector 84. Alternatively, the entire device may be powered from an external power source, such as a mobile telephone device 96 using a USB connector 84 or an input/output prong connector 92.

Data to be amplified using audio output devices 80 is received through the input/output port 92, through a shortwave radio connection 94, or a USB port 84. The output devices 80 may also function as audio input devices, to send commands and other data types to an external device 96. The operation quality of the audio output devices 80 is controlled using the control pad 82.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An audio device comprising, two opposing ear cups; said two opposing ear cups held at distal ends of a headband, wherein a side passing over said ear cups having cushioning, wherein said cushioning providing a conduit for wiring between said two opposing cups, and wherein said headband is a half of an inch thick; each of said two cups having an audio driver; said audio driver being controlled using a control pad on at least one of said cups; an input port, said input port delivering data content to said audio drivers; an output port for providing electrical power to an external circuit; and wherein said two opposing cups having a thickness of three fourth of an inch.

2. The audio device of claim 1, further comprising a noise cancellation microphone.

3. The audio device of claim 1, further comprising a data storage.

4. The audio device of claim 3, wherein data stored on said data storage is being amplified over said ear cups.

5. The audio device of claim 3, wherein a combined weight of all components is 10 ounces.

6. The audio device of claim 1, further comprising a shortwave radio connector.

7. The audio device of claim 1, further comprising at least one strobing safety light.

8. The audio device of claim 1, further comprising an information screen.

9. The audio device of claim 1, wherein one of said ear cups further comprising a logo indicator, said logo indicator capable of providing battery status.

10. The audio device of claim 9, wherein said logo indicator changing color of a light it emits depending on a function being performed by said audio device.

11. An audio device comprising, two opposing ear cups; said two opposing ear cups held, at distal ends of a headband, wherein a side of said headband passing over said ear cups having cushioning, wherein said cushioning providing a conduit for wiring between said two opposing cups, and wherein said headband is a half of an inch thick each of said two cups having an audio driver: said audio driver being controlled using a control pad on at least one of said cups; an input port, said input port delivering data content to said audio drivers; an output port for providing electrical power to an external circuit; wherein said two opposing cups having a thickness of three fourth of an inch; and wherein said audio device weighing between 8 ounces and 10 ounces.

12. The audio device of claim 11, further comprising a noise cancellation microphone.

13. The audio device of claim 12, further comprising a data storage.

14. The audio device of claim 13, further comprising a shortwave radio connector.

15. The audio device of claim 14, wherein a combined weight of all components is 10 ounces.

16. The audio device of claim 15, further comprising an information screen.

17. The audio device of claim 16, wherein one of said ear cups further comprising a logo indicator, said logo indicator capable of providing battery status; and wherein said logo indicator changing color of a light it emits depending on a function being performed by said audio device.

18. The audio device of claim 11, further comprising at least one strobing safety light.

* * * * *